(12) United States Patent
Eraker et al.

(10) Patent No.: US 9,213,461 B2
(45) Date of Patent: Dec. 15, 2015

(54) WEB-BASED REAL ESTATE MAPPING SYSTEM

(75) Inventors: David Eraker, Seattle, WA (US); Adam Michael Dougherty, Seattle, WA (US); Edward M. Smith, Woodinville, WA (US); Stephen Eraker, Clackamas, OR (US)

(73) Assignee: Redfin Corporation, Seattle, WA (US)

( * ) Notice: Subject to any disclaimer, the term of this patent is extended or adjusted under 35 U.S.C. 154(b) by 1148 days.

(21) Appl. No.: 11/154,263

(22) Filed: Jun. 16, 2005

(65) Prior Publication Data

US 2005/0288957 A1 Dec. 29, 2005

Related U.S. Application Data

(60) Provisional application No. 60/580,046, filed on Jun. 16, 2004, provisional application No. 60/649,459, filed on Feb. 1, 2005.

(51) Int. Cl.
*G06Q 50/00* (2012.01)
*G06Q 30/00* (2012.01)
*G06F 3/0481* (2013.01)
*G06Q 50/16* (2012.01)

(52) U.S. Cl.
CPC .............. *G06F 3/0481* (2013.01); *G06Q 30/00* (2013.01); *G06Q 50/16* (2013.01)

(58) Field of Classification Search
USPC ...................................................... 705/1, 313
See application file for complete search history.

(56) References Cited

U.S. PATENT DOCUMENTS

| | | | |
|---|---|---|---|
| 5,844,570 A | 12/1998 | Curtright et al. | |
| 5,884,216 A | 3/1999 | Shah et al. | |
| 6,058,369 A | 5/2000 | Rothstein | |
| 6,636,803 B1 * | 10/2003 | Hartz et al. | 701/459 |
| 6,684,196 B1 | 1/2004 | Mini et al. | |
| 6,839,880 B1 | 1/2005 | Morse et al. | |
| 6,882,313 B1 | 4/2005 | Fan et al. | |
| 6,883,002 B2 | 4/2005 | Faudman | |
| 7,085,650 B2 | 8/2006 | Anderson | |
| 7,212,670 B1 | 5/2007 | Rousselle et al. | |
| 7,283,909 B1 | 10/2007 | Olsen et al. | |
| 7,346,519 B2 | 3/2008 | Carr et al. | |
| 2001/0037273 A1 | 11/2001 | Greenlee, Jr. | |
| 2001/0039506 A1 | 11/2001 | Robbins | |
| 2002/0010572 A1 | 1/2002 | Orton et al. | |
| 2002/0046077 A1 | 4/2002 | Mozayeny et al. | |
| 2002/0049624 A1 | 4/2002 | Raveis, Jr. | |

(Continued)

OTHER PUBLICATIONS

Internet wayback machine: showing that "www.redfin.com" domain name was in use more than one year before applicant's effective filing date.*

(Continued)

*Primary Examiner* — Matthew T Sittner
(74) *Attorney, Agent, or Firm* — Lee & Hayes, PLLC; Richard Brian Leggett; Rachel A. Haller

(57) ABSTRACT

An innovative web-based tool displays visual information about real estate. In one embodiment, an aerial image is overlaid with various data layers to visually present real estate data. Data associated with various embodiments of the tool can include tax parcel information, historical sales information, Multiple Listing Service information, school information, neighborhood information, and park information.

21 Claims, 13 Drawing Sheets

(56) References Cited

U.S. PATENT DOCUMENTS

| | | |
|---|---|---|
| 2002/0087389 A1 | 7/2002 | Sklarz et al. |
| 2002/0128857 A1 | 9/2002 | Lee |
| 2002/0133374 A1 | 9/2002 | Agoni |
| 2002/0138485 A1 | 9/2002 | Faudman |
| 2002/0198736 A1* | 12/2002 | Harrison .......................... 705/1 |
| 2003/0011599 A1 | 1/2003 | Du |
| 2003/0040934 A1 | 2/2003 | Skidmore et al. |
| 2003/0064705 A1* | 4/2003 | Desiderio .................... 455/412 |
| 2003/0101063 A1 | 5/2003 | Sexton et al. |
| 2003/0101074 A1* | 5/2003 | Suzuki et al. ..................... 705/1 |
| 2003/0140064 A1 | 7/2003 | Klein |
| 2003/0158786 A1 | 8/2003 | Yaron |
| 2003/0204406 A1 | 10/2003 | Reardon et al. |
| 2004/0008866 A1 | 1/2004 | Rhoads et al. |
| 2004/0030616 A1 | 2/2004 | Florance et al. |
| 2004/0039629 A1* | 2/2004 | Hoffman et al. ................ 705/10 |
| 2004/0044696 A1* | 3/2004 | Frost ............................ 707/200 |
| 2004/0046798 A1 | 3/2004 | Alen |
| 2004/0049406 A1 | 3/2004 | Muncaster et al. |
| 2004/0064334 A1 | 4/2004 | Nye |
| 2004/0088172 A1 | 5/2004 | Baglioni |
| 2004/0098284 A1 | 5/2004 | Petito et al. |
| 2004/0119759 A1 | 6/2004 | Barros |
| 2004/0167797 A1 | 8/2004 | Goncalves |
| 2004/0172418 A1* | 9/2004 | Dorum et al. .............. 707/104.1 |
| 2004/0220906 A1* | 11/2004 | Gargi et al. ........................ 707/3 |
| 2004/0243533 A1* | 12/2004 | Dempster et al. ................. 707/1 |
| 2004/0249705 A1 | 12/2004 | Spencer et al. |
| 2005/0004927 A1 | 1/2005 | Singer |
| 2005/0010423 A1 | 1/2005 | Bagbey et al. |
| 2005/0049953 A1 | 3/2005 | Vu |
| 2005/0080723 A1 | 4/2005 | Burchetta et al. |
| 2005/0096926 A1* | 5/2005 | Eaton et al. ........................ 705/1 |
| 2005/0125237 A1 | 6/2005 | Harrison |
| 2005/0132305 A1* | 6/2005 | Guichard et al. ............. 715/855 |
| 2005/0149561 A1* | 7/2005 | Hodnett et al. ............. 707/104.1 |
| 2005/0192930 A1 | 9/2005 | Hightower |
| 2005/0195219 A1 | 9/2005 | Hirono |
| 2005/0203671 A1 | 9/2005 | Mertins et al. |
| 2005/0203768 A1 | 9/2005 | Florance et al. |
| 2005/0240448 A1 | 10/2005 | Smith |
| 2005/0273346 A1 | 12/2005 | Frost |
| 2005/0273354 A1 | 12/2005 | Adams |
| 2005/0288958 A1 | 12/2005 | Eraker et al. |
| 2006/0174209 A1 | 8/2006 | Barros |
| 2008/0097767 A1 | 4/2008 | Milman et al. |
| 2008/0133423 A1 | 6/2008 | Adiga et al. |
| 2011/0010302 A1 | 1/2011 | Faudman |

OTHER PUBLICATIONS

Pdf file of www.redfin.com website; FAQ section indicating that Redfin.com was founded in 2002.*
Office action for U.S. Appl. No. 11/154,937, mailed on Jul. 29, 2013, Eraker et al., "Online Marketplace for Real Estate Transactions", 54 pages.
Office action for U.S. Appl. No. 13/754,833, mailed on Sep. 23, 2013, Eraker et al., "Collaborative System for Online Search", 38 pages.
Final Office Action for U.S. Appl. No. 11/154,937, mailed on Nov. 29, 2013, David Eraker, "Online Marketplace for Real Estate Transactions", 73 pages.
Office Action for U.S. Appl. No. 13/754,808, mailed on Oct. 17, 2013, David Eraker, "User Interfaces for Displaying Geographic Information", 42 pages.
Final Office Action for U.S. Appl. No. 13/754,833, mailed on Apr. 14, 2014, David Eraker, "Collaborative System for Online Search", 32 pages.
Final Office Action for U.S. Appl. No. 13/754,808, mailed on Apr. 8, 2014, David Eraker, "User Interfaces for Displaying Geographic Information", 44 pages.
Notice of Allowance mailed Apr. 1, 2015 in U.S. Appl. No. 11/154,937.
Office Action mailed Feb. 24, 2015 in U.S. Appl. No. 13/754,833.
Office Action mailed Feb. 25, 2015 in U.S. Appl. No. 13/754,808.
Office Action mailed Jun. 18, 2015 in U.S. Appl. No. 13/754,808.
Office Action mailed Jun. 22, 2015 in U.S. Appl. No. 13/754,833.

* cited by examiner

Fig. 9.

WEB-BASED REAL ESTATE MAPPING SYSTEM

CROSS-REFERENCE TO RELATED APPLICATIONS

This application claims the benefit of U.S. Provisional Patent Application No. 60/580,046, filed Jun. 16, 2004, and U.S. Provisional Patent Application No. 60/649,459, filed Feb. 1, 2005, which are incorporated herein by reference.

FIELD OF THE INVENTION

This disclosure relates generally to web-based mapping systems and, more particularly, relates to enhancing aerial maps with real estate data.

BACKGROUND OF THE INVENTION

Homeowners and homebuyers have long- needed an efficient way to discover and evaluate information about real estate properties. The typical homebuyer finds information about real estate properties by hiring a real estate agent, by driving through neighborhoods in which the homebuyer would like to live, or perhaps by checking the classified advertisements section of the newspaper. None of those methods are completely satisfactory solutions to the problem of finding and buying a home.

There is a need for a system that overcomes limitations of the current real estate system, as well as providing additional benefits.

SUMMARY OF THE INVENTION

A brief summary of some embodiments and aspects of the invention are first presented. Some simplifications and omissions may be made in the following summary; the summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the Figures, and from the claims (which follow the detailed description).

Under some embodiments of the invention, a web site system visually presents real estate information to a computer user by displaying a satellite image of a geographic region on the computer's display. Real estate properties for sale within the geographic region are indicated on the satellite image. Various data overlays can be overlaid on the image. The data overlays may include a tax parcel overlay; a street overlay; a park overlay; and/or a school overlay on the satellite image. The web site system can also display multiple listing service (MLS) information of the properties for sale.

Under some embodiments of the invention, a computer system presents real estate information to a user by displaying a satellite image of a geographic region on a client computer. The client computer runs client software applications that communicate with a computer server. The computer server receives a search request from the client computer. The search request has parameters specifying suitable real estate properties. The server searches a central database to determine real estate properties that satisfy the search parameters and that are within the geographic region. The search results are displayed to the user as an overlay on the satellite image. In some embodiments, the overlay superimposes boundaries of at least one real estate property on the satellite image.

Under some embodiments of the invention, a web site system displays real estate properties to a user of a client computer by receiving, at a computer server, a request to display real estate properties for sale within a predetermined geographic region. The system populates a data store with real estate information that can include multiple listing service information and at least one selected from the group of tax parcel information, tax assessor information, school district information, neighborhood information, and recreation information. The computer server searches the data store for real estate properties for sale within the predetermined geographic region. The server then transmits the search results to the client computer. After receiving the search results, the client computer visually presents the results to the computer user as an overlay on a satellite image of the geographic region.

Under some embodiments, a web site system enables a web page that combines an aerial image map (such as a satellite image) with MLS data for a real estate property. The real estate property is within the region shown in the aerial image map. The web site system may further provide tax parcel information and sales history for the real estate property.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings, wherein:

FIG. 9 shows a representative sales history for the selected property.

Figure 1:
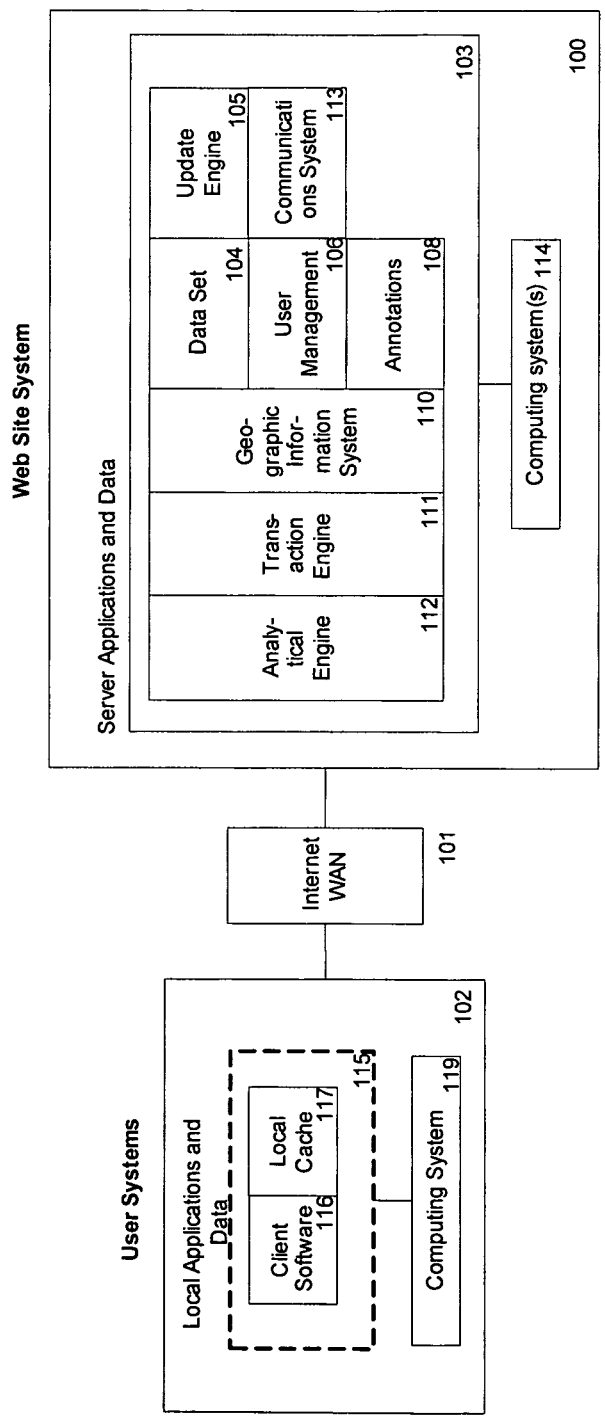
FIG. 1 shows a block diagram web site system according to an embodiment of the invention.

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 1104 is first introduced and discussed with respect to FIG. 11).

DETAILED DESCRIPTION OF THE PREFERRED EMBODIMENT

The following description provides specific details for a thorough understanding of, and enabling description for, these embodiments of the invention. However, a person of ordinary skill in the art will understand that the invention may be practiced with many variations and these details do not list every possible variation. In some instances, well known structures and functions have not been shown or described in detail to avoid unnecessarily obscuring the description of the embodiments of the invention.

Definitions: In general, brief definitions of several terms used herein are preceded by the term being enclosed within double quotation marks. Such definitions, although brief, will help those skilled in the relevant art to more fully appreciate aspects of the invention based on the detailed description provided herein. Such definitions are further defined by the description of the invention as a whole (including the claims) and not simply by such definitions.

Figure 2:
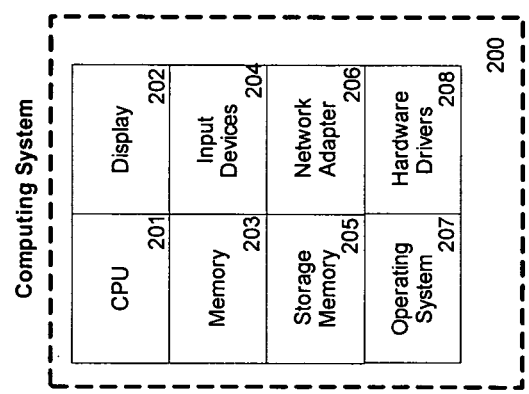
FIG. 2 shows a block diagram of an embodiment of a computer system suitable for use with the disclosed inventions.

FIG. 1 and FIG. 2 describe a Web Site System 100 that allows one or more users, each operating a User System 102, to submit, request, and view data over a wide are network (WAN) such as the Internet 101. The Internet is a combination of (public and/or private) networks that are linked by standard communication protocols such as TCP/IP and HTTP. The Web Site System and User system interact via a client-server relationship wherein a program on the User System or Client Software 116 "client" makes a request to a Web Site System operating as a "server". The client waits for a response and then processes the response to display information. The client can be a standard web browser such as Netscape Explorer or Microsoft's Internet Explorer, including browser plug-ins such as Macromedia Flash, or specialized client software downloaded from the server.

The Web Site System 100 is composed of Server Applications and Data 103 and one or more WSS Computing Systems 114. Components of the Applications and Data 103 may be distributed across multiple Computing Systems 114.

The User System 102 is composed of Local Applications and Data 115 and a User Computing System 119. Computing systems may be a traditional desktop computer or mobile device such as portable computer, personal digital assistant (PDA), mobile phone, or the like.

The Computing Systems 114 and 119 may comprise: a Central Processing Unit "CPU" 201 for executing commands; an optional Display 202 for conveying visual information to a user; Memory 203 for temporarily holding information and instructions; optional Input Devices 204 which can include a keyboard, mouse, microphone or other apparatus for entering instructions or data; Storage Memory 205 which stores information and software applications; a Network Adapter 206 for communicating over the Internet, local area network, or other network; an Operating System 207 for coordinating between the various components and software applications; and various Hardware Drivers 208 that allow the operating system to communicate with physical elements of the Computing Systems 114 and 119.

The Data Set 104 includes information that provides functionality to users of the Web Site System 100. Various embodiments of the Data Set 104 include combinations of property addresses, historical property transactions, tax assessor records (which may include prior sales data), other government data sources, listings of properties for sale including photos and multimedia, satellite photography and other raster-based data sets, parcel outlines and other vector-based data, neighborhood boundaries and names, zip codes, parks, schools, roads, businesses, and relevant geographic coordinates associated with the various data elements. The data set also includes non-geographic data that describes or relates to other geographic data elements, such as school information, neighborhood profiles, etc. In addition to these data elements, the web site system may include hyperlinks to various Internet-based sources of information. Some embodiments of the system can overlay data from the Data Set 104 as overlay layers (e.g., tax parcel boundaries, parks, schools, etc.) on a base layer (e.g., a satellite image, aerial photo, etc.).

The Data Set 104 also contains user-specific information. This includes information entered by users via User Management 106, described below; system-generated user data; and data generated by system users about other system users.

The Data Set 104 also contains information generated using the Annotations 108 functionality. Annotations 108 include text-based comments, pictures, videos, or other types of digital information that is added to the Web Site System 100 by various users. A user can add Annotations 108 into the Web Site System 100 and associate this information with various elements of the Data Set 104. Annotations 108 added to the Web Site System 100 may be public or private. Annotations may be shared between specific users or with all users of the Web Site System 100.

The Update Engine 105 adds new data elements to the existing Data Set 104 through a number of mechanisms including FTP, manual data loads, and "crawling" or "scraping" of related documents and information found on the Internet 101.

The User Management 106 system provides for the enrollment of various users, profile creation, user-specific capabilities, and the management of various user profiles. User Management 106 provides different capabilities for various users of the system including: consumers who may be interested in buying or selling real estate; real estate agents; associated professionals including appraisers, mortgage lenders, escrow providers, title insurance providers, property management providers; associates of users, such as consumer friends and family members; and other parties that may be involved in a real estate transaction. Finally, User Management 106 may use a cookie or other signifier specific to the user within the Local Cache 117 on the User System 102. User-specific data is contained within the Data Set 104 described previously.

The Analytical Engine 112 processes various elements of the Data Set 104 to provide derivative calculations, associations, comparisons, or predictions to users of the system. In addition, the Analytical Engine 112 may associate components of the Data Set 104 or User Management system 106 and store these associations in the Web Site System 100. The Analytical Engine 112 further associates elements of the Data Set 104 by an address matching mechanism. For example, new property listings received from a multiple listing service (MLS) are associated with their prior transaction records or legal description in a tax assessor database through this mechanism.

The Transaction Engine 111 facilitates negotiations, communication, electronic signing of contracts, payment transfers between users, coordination of ongoing transactions, tracking of work performed by users of the system, maintaining pricing, and other marketplace-related elements of the Web Site System 100. This may also include the management and tracking of various referral fees, advertising fees, direct payments, and transaction fees associated with doing business within the Web Site System 100.

Upon completion of a transaction in the marketplace, users can provide feedback and ratings about service providers involved with the transaction. The feedback is associated with the User Profile of the party providing the services via the User Management 106 functionality.

Embodiments of the Geographic Information System (GIS) 110 generate a digital map using elements in the Data Set 104, User Management system 106, or derivative information processed by the Analytical Engine 112. Users can select which elements of the data set to display on the digital map. Further, the GIS 110 provides users with navigation capabilities for moving within the digital map by panning (moving north, east, west, and south) and increasing or decreasing the elevation to adjust the level of detail. The GIS 110 also enables users to select specific elements that are shown on the digital map and return additional information contained within the Data Set 104, Annotations 108, or User Management system 106. The GIS 110 provides for the ability to separately transfer different types of data elements over the Internet and for the storage of these elements on a User System 102 in a Local Cache 117. In this manner the GIS 110 references the User System 102 prior to requesting any information from the Web Site System 100. For example, non-dynamic raster data such as satellite photography may be cached locally on the User System 102 while dynamic text or vector components are sent separately and the two are combined at the client to improve performance. Sending the raster (aerial/satellite) data and the vector (parcel/roads/overlays) separately from the servers to the client and then combining them at the client allows the user to navigate the satellite map without a page reload. Thus, some embodiments have a client framework for managing the raster and vector data sets separately. Finally, elements of the Data Set 104, relationships derived through the Analytical Engine 112, and elements of the User Management system 106 can be tied to a specific geographic location on the map.

The Communications System 113 manages messaging between users, including system messages. Messaging occurs through email and internal messages that are visible to users upon signing into the Web Site System 100.

Figure 3:
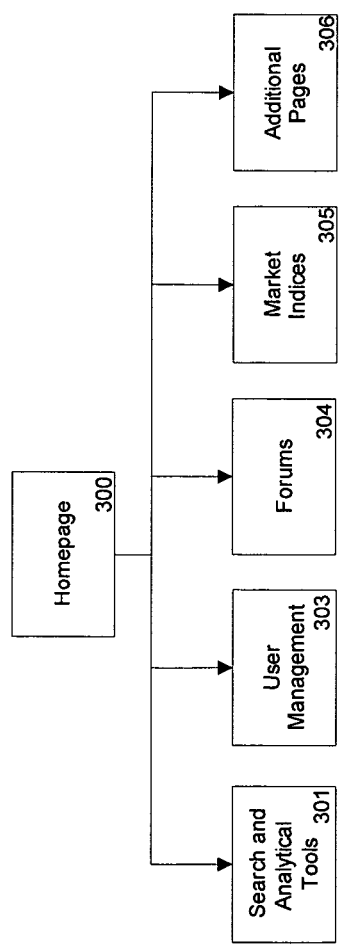
FIG. 3 shows a block diagram of a web site suitable for use with embodiments of the disclosed inventions.

FIG. 3 demonstrates how users of the Web Site System 100 start their interaction with the primary Homepage 300. The Homepage may include a randomly selected property offered for sale, other elements of the Data Set, summary data calculated from the Analytical Engine, or a real estate agent profile. The Homepage additionally includes links to other sections of the Web Site System 100 including Search and Analytical Tools 301, User Management 303, Forums 304, Market Indices 305, and various Additional Pages 306. Forums 304 encompass online discussion/chat groups that are generally started and maintained by system users, and would for example include agent discussion groups, consumer discussion groups, and other vendor groups. These may be organized around user type, geographic area, subject of interest, etc. Additional Pages 306 may include information about the company, educational content for consumers, educational content for real estate professionals, relevant news articles, and other offerings.

The Search and Analytical Tools 301 provide a single integrated framework for evaluating many aspects of a given real estate market. Users may view properties available for sale and assess these properties within the context of prior sales data derived from the tax assessors and other data sources, as well as supplemental area-specific data, market data, and aggregated system user data. Finally, system users can create Annotations 108 to this data that are then associated with their user profile. These annotations can be made public or shared with other users based on preferences configured in the User Management system 106.

The Search and Analytical Tools 301 also provide an open framework that allows consumers, real estate agents, and associated professionals to search other user profiles, take actions based on those search results, and eventually engage in electronic commerce using capabilities contained within the Transaction Engine 111.

User Management 303 allows system users to create and manage accounts within the system, create and manage detailed profiles for publication in the Marketplace 302. Additional features (described in greater detail below) specific to the type of user further facilitate communication and collaboration.

Forums 304 functionality allows users to share experiences and insights, query other users, comment on elements of the various data sets, and improve the value of their shared knowledge. System users may post public comments regarding various elements of the data set including descriptions of various specific neighborhoods, analysis of specific properties for sale, descriptions of the real estate process, and other relevant information. Real estate agents and other associated professionals can contribute to the Forums 304 to further increase their credibility within the Web Site System 100, providing consumers with objective examples of their working knowledge.

Figure 4:
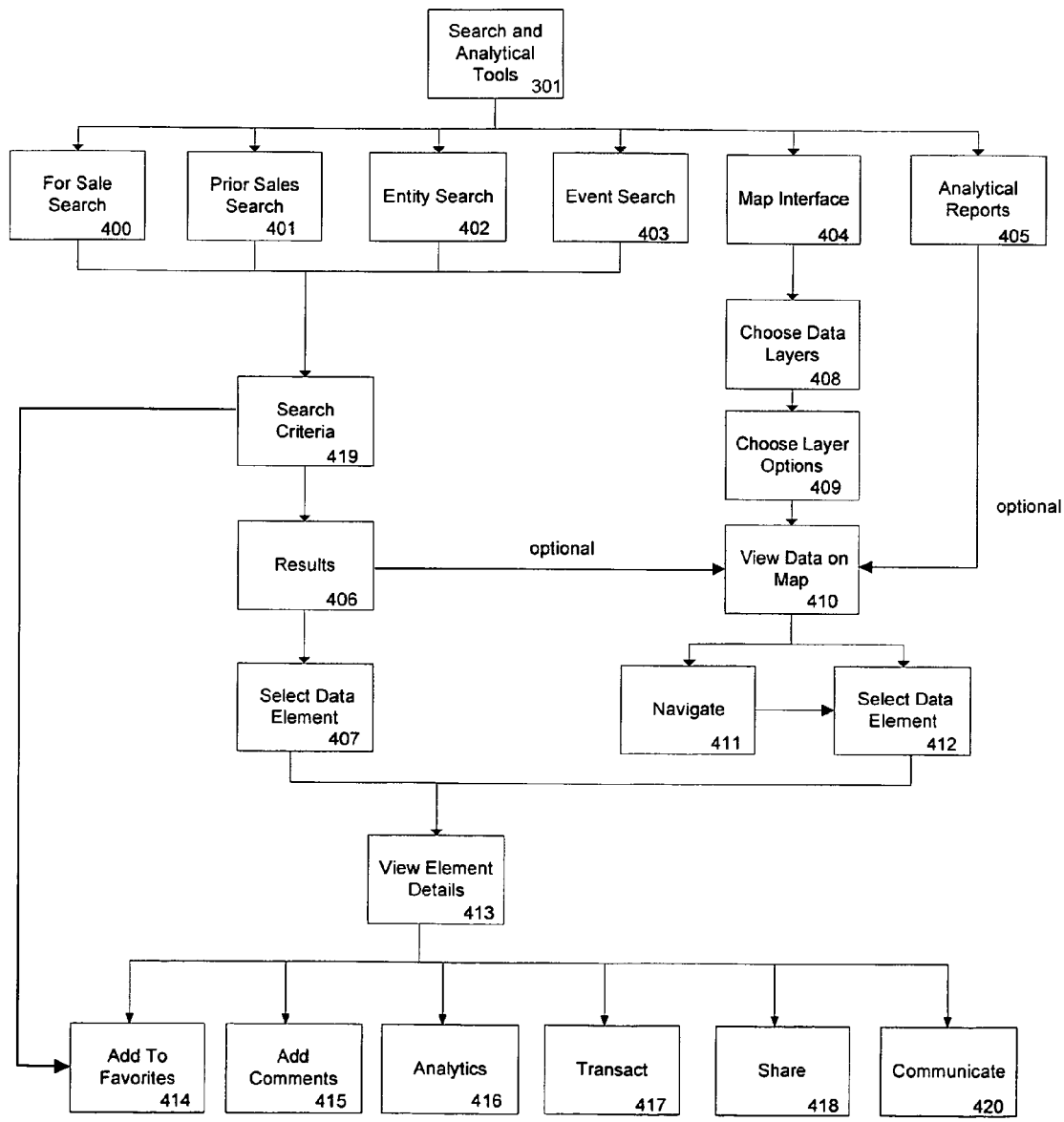
FIG. 4 shows a block diagram of search and analytical tools, according to various embodiments of the invention.

FIG. 4 describes the Search and Analytical Tools 301. Users may conduct a For Sale Search 400, a Prior Sales Search 401, an Entity Search 402, or an Event Search 403. Users may additionally use the Map Interface 404 to search and explore a geographic area, and may view Analytical Reports 405 that display information relative to the real estate market. For example, an analytical report may contain an analysis of real estate trends in a particular geographic region or neighborhood.

A For Sale Search 400 allows users to view all properties within the Data Set 104 that meet certain criteria. Typical criteria would include price, size, location, quantity of various types of rooms, and other attributes commonly of interest in the home buying or selling process.

A Prior Sales Search 401 allows users to view historical sales information that meets certain criteria. Typical criteria would include location, price, date, property size, and other attributes relevant to a property sale.

An Entity Search 402 allows users to view entities that meet certain criteria. Entities could refer to any System User; to any business, such as banks, hotels, restaurants, and the like; to any individual, e.g., for the purposes of viewing public tax records; to parks, schools, bus lines, train stations, and the like; or any other data element that may pertain to an assessment of either the real estate market or a given property. According to user discretion, an Entity Search 402 may be restricted to the Data Set 104; it may encompass data from online sources accessible via the Internet; and it may encompass data local to the User Systems 102. Entity data typically includes geospatial (i.e., location) information, but may not, as in the case of anonymous system users.

The criteria used for an Entity Search 402 may vary according to entity type. Thus, a search for a real estate agent would involve criteria such as customer ratings, number of transactions, type of services provided, areas of specialization, geographic location, languages spoken, and the like. A search for schools might employ criteria such as location, size, grade levels, student/teacher ratios, standardized test score averages, etc.

An Event Search 403 allows users to view events that meet certain criteria. Events could include real estate open houses, scheduled property showings, scheduled user auctions, or other data with a temporal component. According to user discretion, an Event Search 403 may be restricted to the Data Set 104; it may encompass data from online sources accessible via the Internet, for instance to display bus schedules or movie show times; and it may encompass data local to the User Systems 102, e.g., scheduled appointments.

Search Results 406 matching the Search Criteria 419 are returned to the User System 102 for display. Users may optionally select to view the Results 406 either as text, a combination of text and graphics, or in graphical form on a map displayed to the user via the Map Interface 404. Results 406 need not be restricted to the Results of user-generated queries; for example, if a user configured a search to run automatically, this result set could also appear in Results 406.

The Map Interface 404 provides a graphical, map-based framework for viewing, exploring, and analyzing a broad array of data relevant to the real estate market and transaction process. Users of the Map Interface 404 can select between alternate "base map" layers: e.g., raster-based satellite or aerial imagery, or street maps (either raster- or vector-based). Users often select one "base map" layer but may choose to overlay e.g., a street map layer onto a satellite imagery layer.

Users may modify the map in various ways to meet their individual needs. In particular, users may toggle the presence of various Data Layers 408. Valid layers include, but are not limited to, any data type that is a search Result 406 and that possesses geospatial information. Examples of data layers include properties for sale, parks, schools, outlines of property tax parcels, neighborhoods, school districts, congressional districts, census areas, bus lines, trains, retail establishments, real estate agent offices, hospitals, zoning maps, and the like.

Valid data layers may also include data from the Analytical Engine 112. Examples include neighborhood appreciation trends, area-based market activity, and the like.

Users may then View Data on the Map 410. Data sets may be displayed through a variety of means. Data that can be linked to a specific property (e.g., property data or entity data containing an address, such as a real estate office or hospital) may be represented with either a graphical icon in the correct location or by graphically outlining or illustrating the land parcel corresponding to the given property. Temporal data such as historical property sales may be displayed in this manner, or using an animated interface that updates the map according to a visible progression through time. For example, home sales trends can be visually communicated by overlaying a three color layer on the base map, where "blue" is overlaid on areas where home sales are slow (i.e., cool), yellow is overlaid on areas where home sales are average, and red is overlaid on areas where home sales are "hot". By use of the overlay, the user can quickly see which areas or properties have historically been most desirable to other home buyers.

Users may then Navigate 411 in the Map Interface. Navigation includes pan/zoom functionality, so that the user can select the area and resolution (i.e., viewing area) of interest. The resolution of the map interface corresponds to an elevation above the map. A low elevation is associated with high resolution (i.e., zooming in), which shows a smaller geographic area. A high elevation is associated with a low resolution (i.e., zooming out) and shows a larger geographic area. In other words, the elevation associated with a particular map view is high (e.g., as if in an airplane) if the map shows a large area and lower (e.g., as if in a tall building) if the map shows a small area.

Users may also Select Data Elements 412. In general, any data layer may be user-selectable. Upon selection of a data element, the Search and Analytical Tool 301 then displays the Element Details 413.

The Element Details consist of additional data relevant to a user-selected data element. In general, the Element Details function is similar for Results selected from the map and Results selected from a text- or text-and-graphics-based display. Data presented in Element Details may be restricted to the Data Set 104; it may encompass data from online sources accessible via the Internet, as well as links to that data; and it may encompass data local to the User Systems 102. Examples of Element Details include information about properties for sale, such as the house price, photographs, description of the property, the number of various types of rooms, etc.; school information; park information; real estate agent details, etc.

Upon viewing Element Details, users may take several actions. First, they may choose to add the data element to their Favorites 414, if for example the data element is a property that they wish to flag in a folder (examples include "interested", "reject", etc). Favorites could also apply to real estate agents, consumers, schools, and any other data elements. Second, users may wish to Add Comments 415 to a data element, and to determine which other users may view these comments. Third, users may wish to perform additional Analytics 416 on the given data element. This may result in an additional search (e.g., "find nearest 10 historical sales within the last 3 months") or may simply represent additional analysis (e.g., "evaluate whether this property is over- or undervalued relative to other available properties"). Fourth, users may Transact 417 against the given data element. They may wish to schedule a visit to a property; to contact an agent to request additional information or a bid for services; etc. Fifth, users may wish to Share 418 the data element with other users or other non-member entities; this is typically achieved by embedding a link to the data element details or search results inside an email. Sixth, for agent or other entity data elements, users may wish to Communicate 420 with the individual or organization involved, generally via email. Lastly, users may choose to ignore the data element, and resume searching via any steps in FIG. 4.

Search and Analytical Tools 301 also provides the ability to save user searches. After entering any Search Criteria 419, users may save these criteria using Favorites 414, and may then configure the Web Site System 100 to automatically run these searches as described previously.

Figure 5:
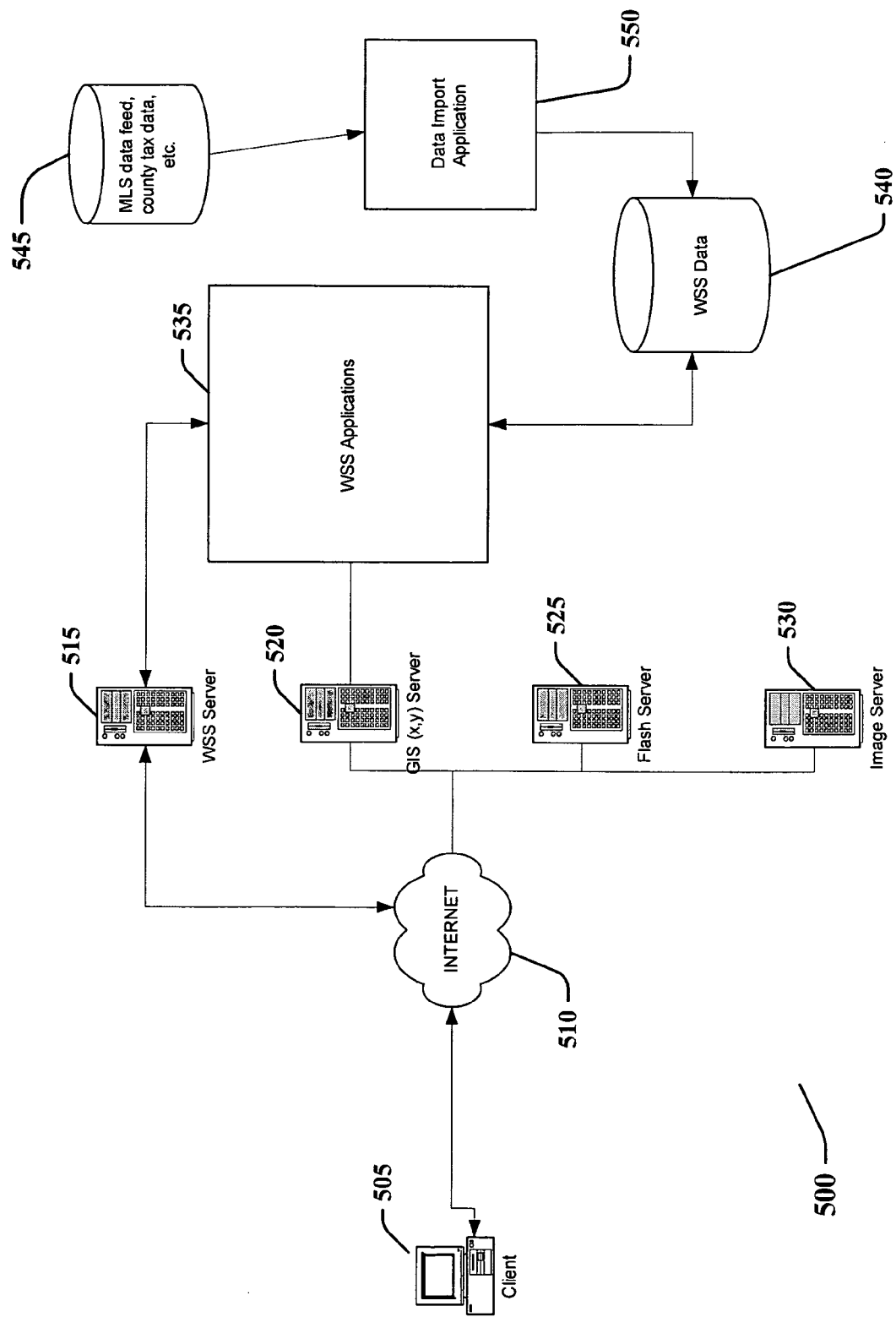
FIG. 5 shows a network diagram of a web site system according to an embodiment of the invention.

FIG. 5 shows a network diagram of a web site system 500 according to some embodiments of the disclosed invention. A client computer 505 connects to the system servers 515, 520, 525, 530 via a wide area network such as Internet 510. WSS server 515 and GIS server 520 connect with WSS database 540 via WSS application software 535. External databases 545 are connected with WSS database 540 by Data Import Application 550.

Client computer 505 runs client software such as an Internet browser (i.e., web browser), flash plug-ins, and any other software useful to show web pages to the computer user. Client computer 505 may alternatively be a thin client device.

WSS Server 515 provides controls the web page presentation and communicates with the client device 505. WSS Server 515 also interacts with WSS database 540 via WSS Applications 535. In some embodiments, WSS Server 515 also provides raster based graphics to Client 505 for overlays such as tax parcel boundary overlays.

GIS Server 520 provides graphical information system capability to the web site system 500. In some embodiments, GIS Server 520 provides x,y,z lat/long/elevation coordinates for the image and overlays as discussed above. By use of the coordinates, the overlays can be correctly positioned on the map image.

Flash server 525 provides vector graphics-based animation and interactive with navigation to client 505. A Flash plug-in running on client 505 allows the graphics to look the same regardless of the web browser running on client 505.

Image Server 530 provides images for the aerial image that is presented to the web site visitors. In some embodiments, Image Server 530 also provides raster based graphics for overlays such as tax parcel boundary overlays.

WSS Database 540 is typically accessed via WSS application software 535 (such as Java, NET, etc.).

Data Import application 550 translates data from external databases 545, such as MLS data, tax assessor data, etc., for storage in WSS Database 540.

Data Import application 550 populates WSS database 540 from external databases 545.

Figure 6:
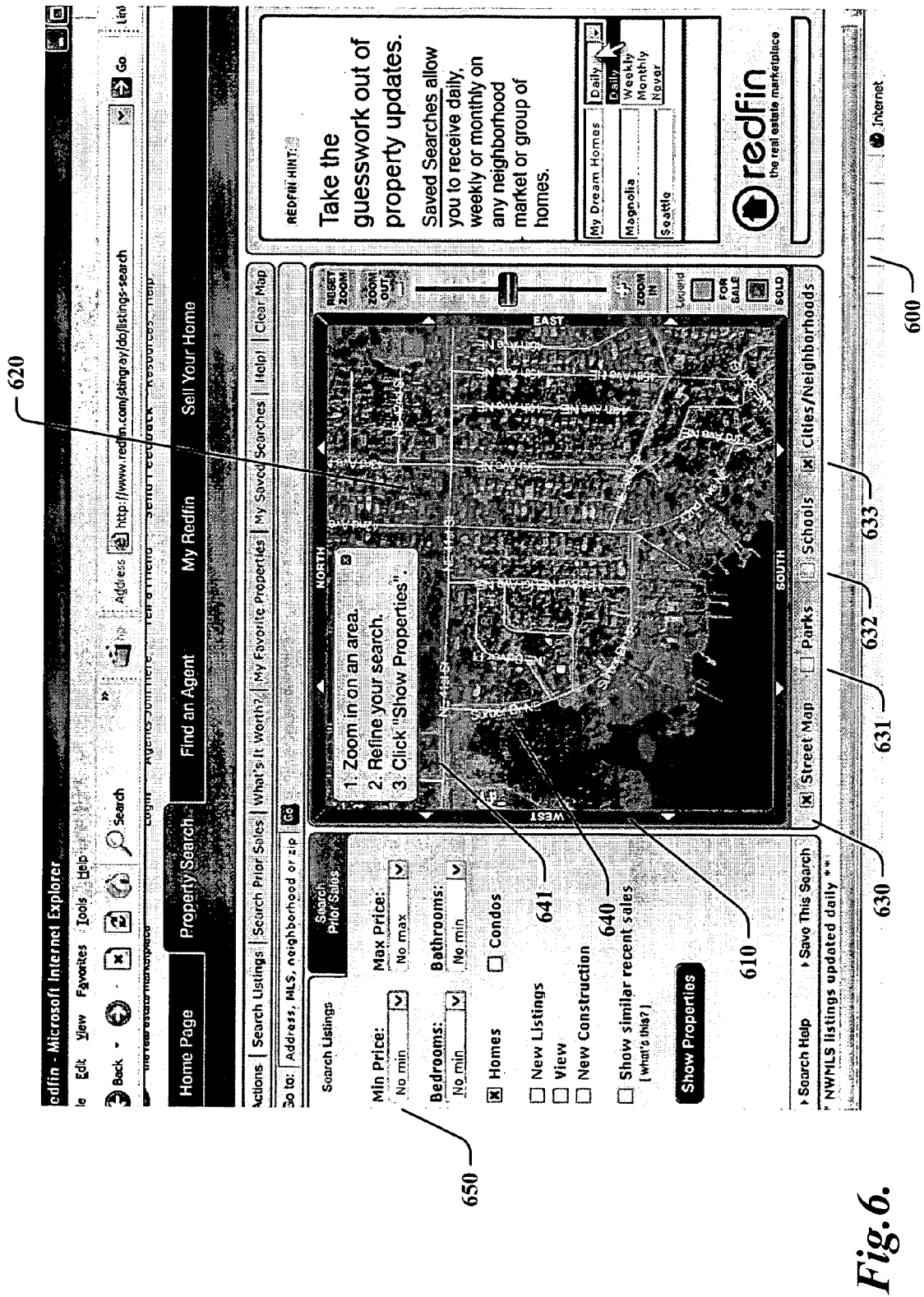
FIG. 6 shows a web page having an aerial image according to embodiments of the disclosed invention.

FIG. 6 shows a web page 600 according to embodiments of the disclosed invention. An aerial image 620 is displayed in viewing window 610 of web page 600. Various overlays 630-633 can be selected on the web page 600. A street map 630 and a neighborhood 633 overlay have been selected in the example shown. Selection of the street map overlay 630 causes street names 640 (e.g., "Surber Dr NE") and/or street vectors 641 to be overlaid on image 620. Selection of the neighborhood overlay 630 causes neighborhood or community names to be overlaid on image 620. When an overlay is selected, flash server 525, GIS server 520 and WSS server 515 operate to plot and align the coordinates of the overlay entities (e.g., vector or raster-based imagery) with the image 620. Alternatively, the client software can plot and align the coordinates of the overlay entities. Other overlays such as park 631, school 632, etc., can be selected and displayed in a similar manner. Depending upon the elevation or "zoom" some overlays may not be visible even though they are selected. For example, if the elevation is too high, the tax parcels would be proportionately too small to show on the image. Thus, the tax parcel overlay might be "turned on" only when the viewing window is below a predetermined height.

The user can select search parameters 650 for searching the real estate listings in the displayed area. Search query parameters 650 can include minimum price, maximum price, number of bedrooms, number of bathrooms, homes, condos, new listings, new construction, etc. By selecting these search parameters, the user causes the web site system 100 to display image 620 with a tax parcel boundary overlay that shows each property matching the search terms.

Figure 7:
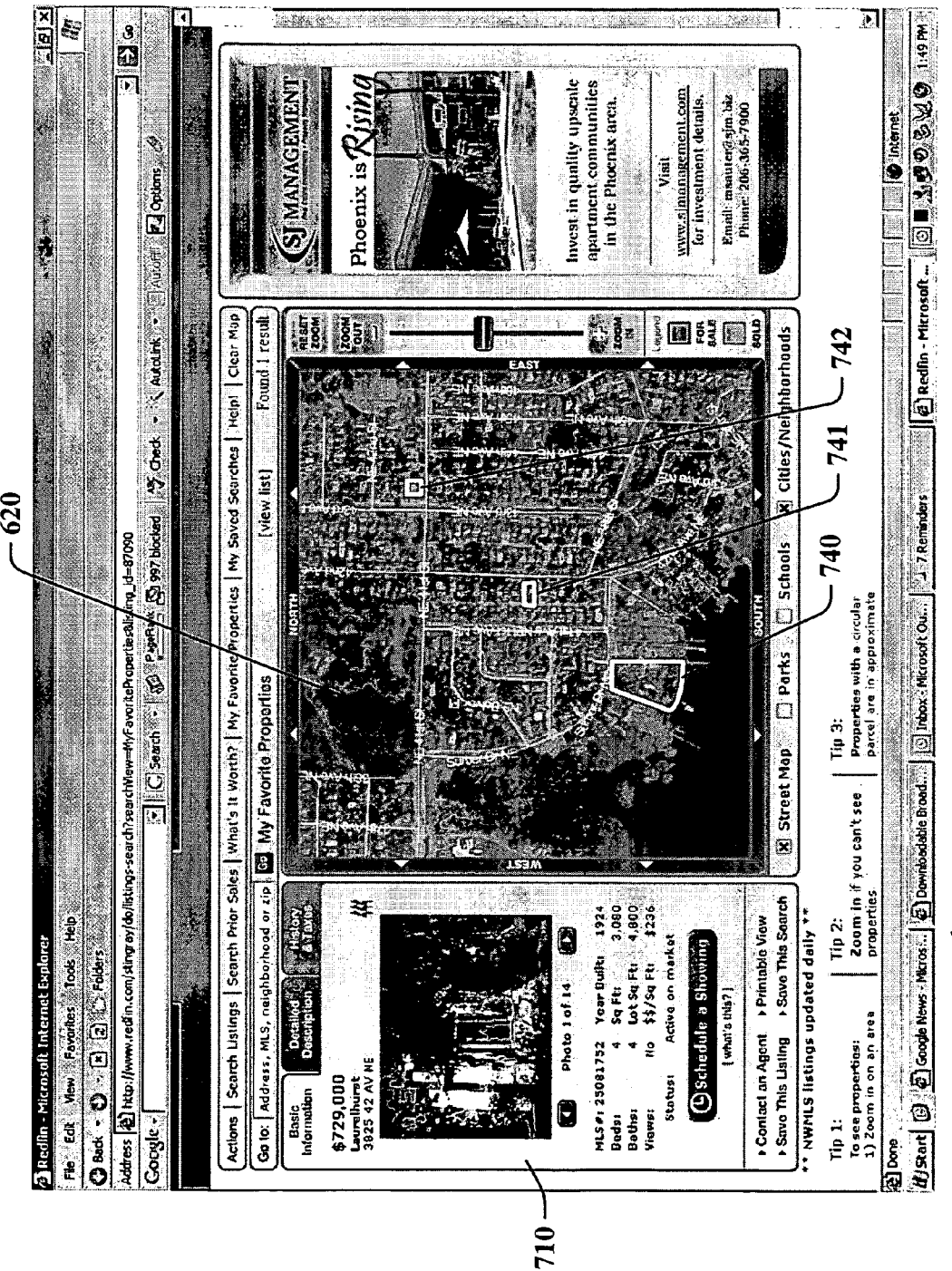
FIG. 7 shows a search result overlay on the image of FIG. 6.

FIG. 7 shows an example of a "for sale" overlay on the web page of FIG. 6. The user has searched for houses for sale within the displayed area. The search results are displayed in a "For sale" overlay, which shows results 740, 741, 742 indicating that there are currently three houses for sale in the area. When the user selects one of the displayed search results (e.g., 741), the web site system 100 retrieves and displays more information 710 about the selected property. Basic information about the selected property can include its MLS information, photos of the property, etc.

The client computer 505 transmits the parcel selection to the WSS Server 515. After receiving the parcel selection, the WSS Server 515 retrieves the MLS information 710 from WSS Database 540 and updates web page 600 accordingly. In the example shown, MLS data 710 includes photographs, address, sales price, square footage, year built, number of bedrooms, and number of bathrooms of the selected property 741.

Figure 8:
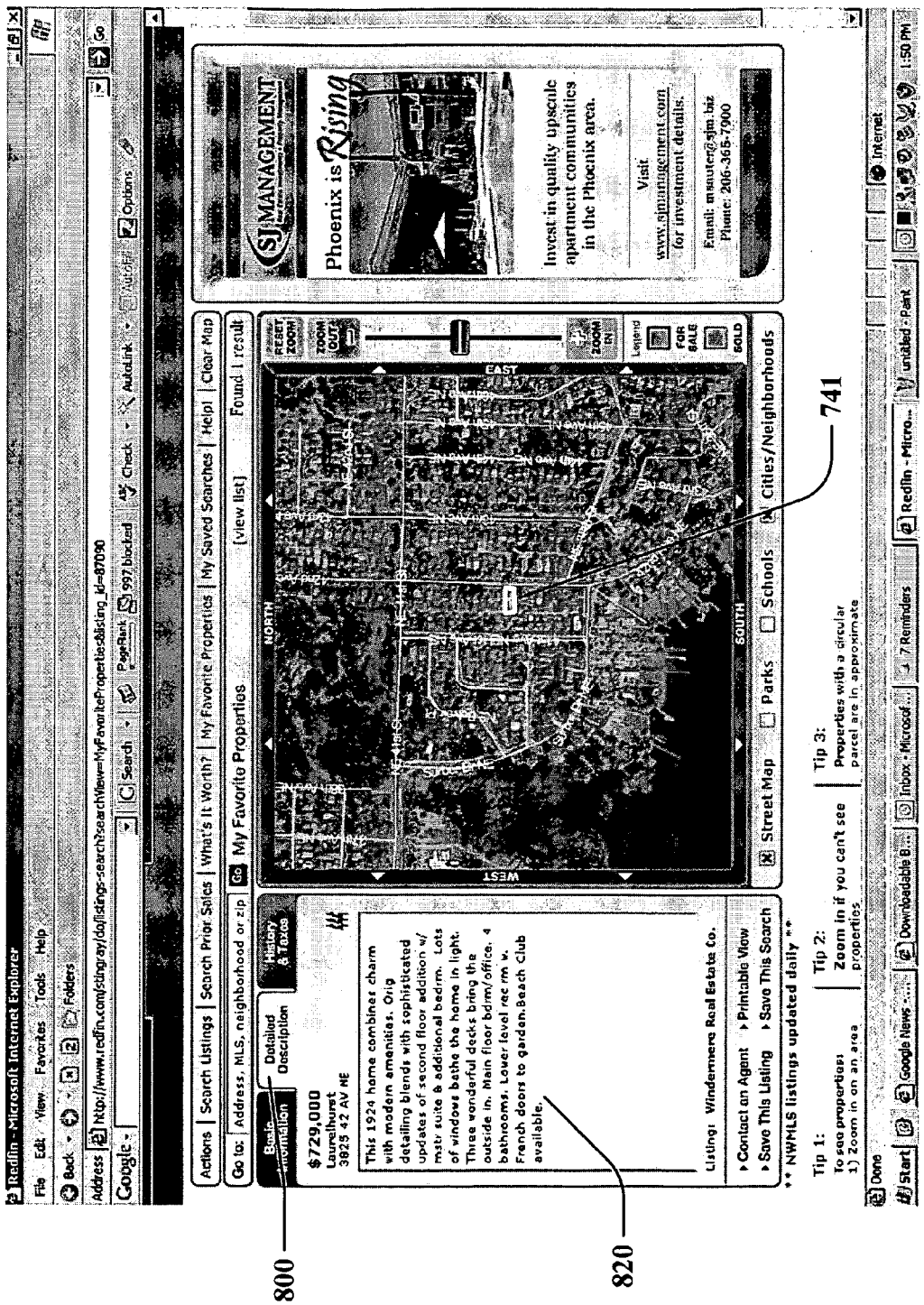
FIG. 8 shows a region on the webpage having detailed information for a property selected from the search results of FIG. 7.

FIG. 8 shows an example of a web page displaying additional MLS information according to embodiments of the disclosed invention. By selecting tax parcel 741 and Details tab 800 with a pointing device such as a computer mouse, the web site system 100 will display additional MLS data 820 associated with tax parcel 741. In the example shown, this additional MLS data 820 is a written description of the selected property 741.

Figure 9:
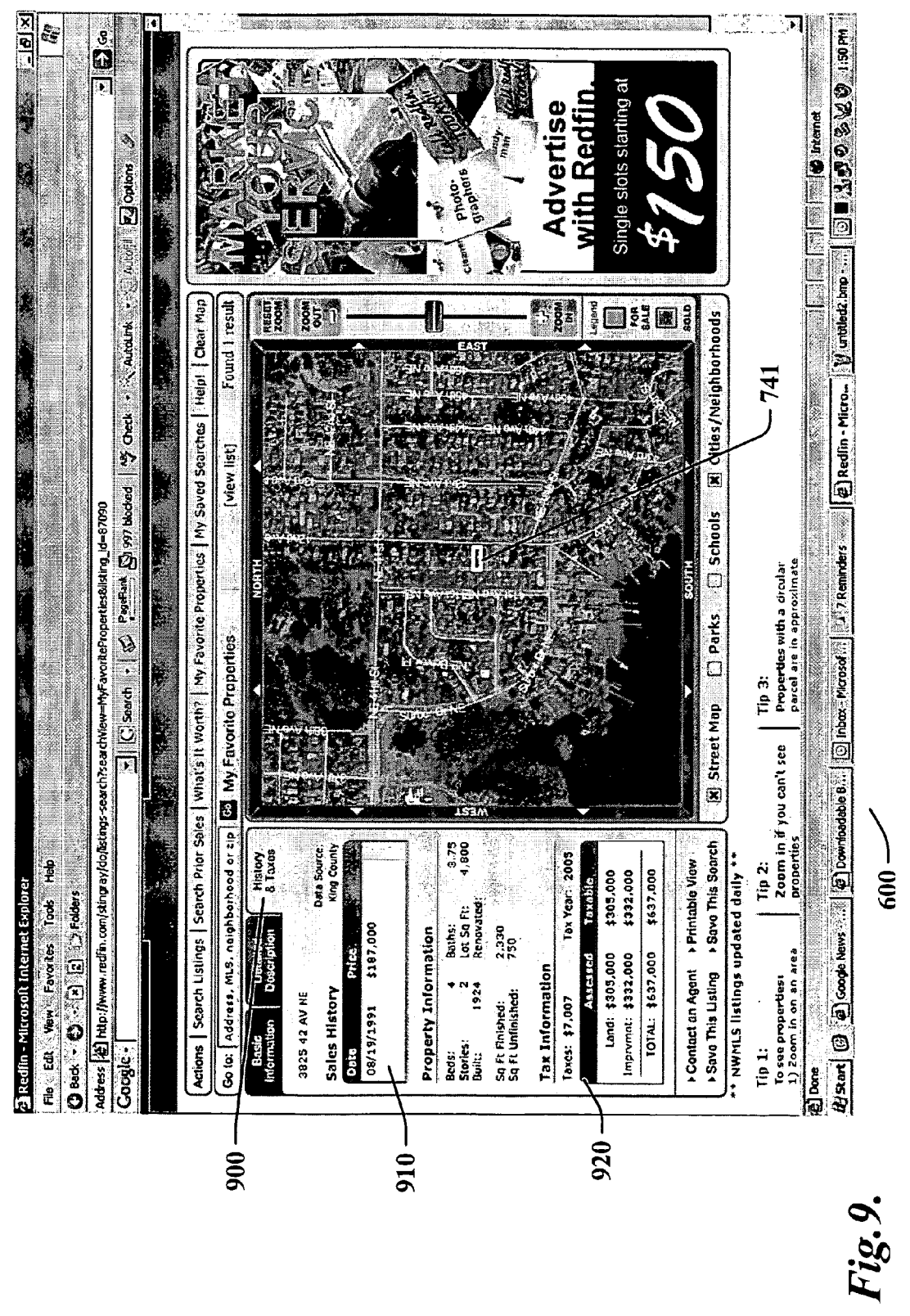

FIG. 9 shows an example of a web page displaying tax assessor and sales history information for a property according to some embodiments of the disclosed invention. By selecting tax parcel 741 and History/Taxes tab 900 with a pointing device such as a computer mouse, the web site system 100 will display the Tax data 920 and sales history data 910 associated with tax parcel 741. The client computer 505 transmits the parcel selection to the WSS Server 515. After receiving the parcel selection, the WSS Server 515 retrieves the tax 920 and sales history 910 information from WSS Database 540 and updates web page 600 accordingly.

Figure 10:
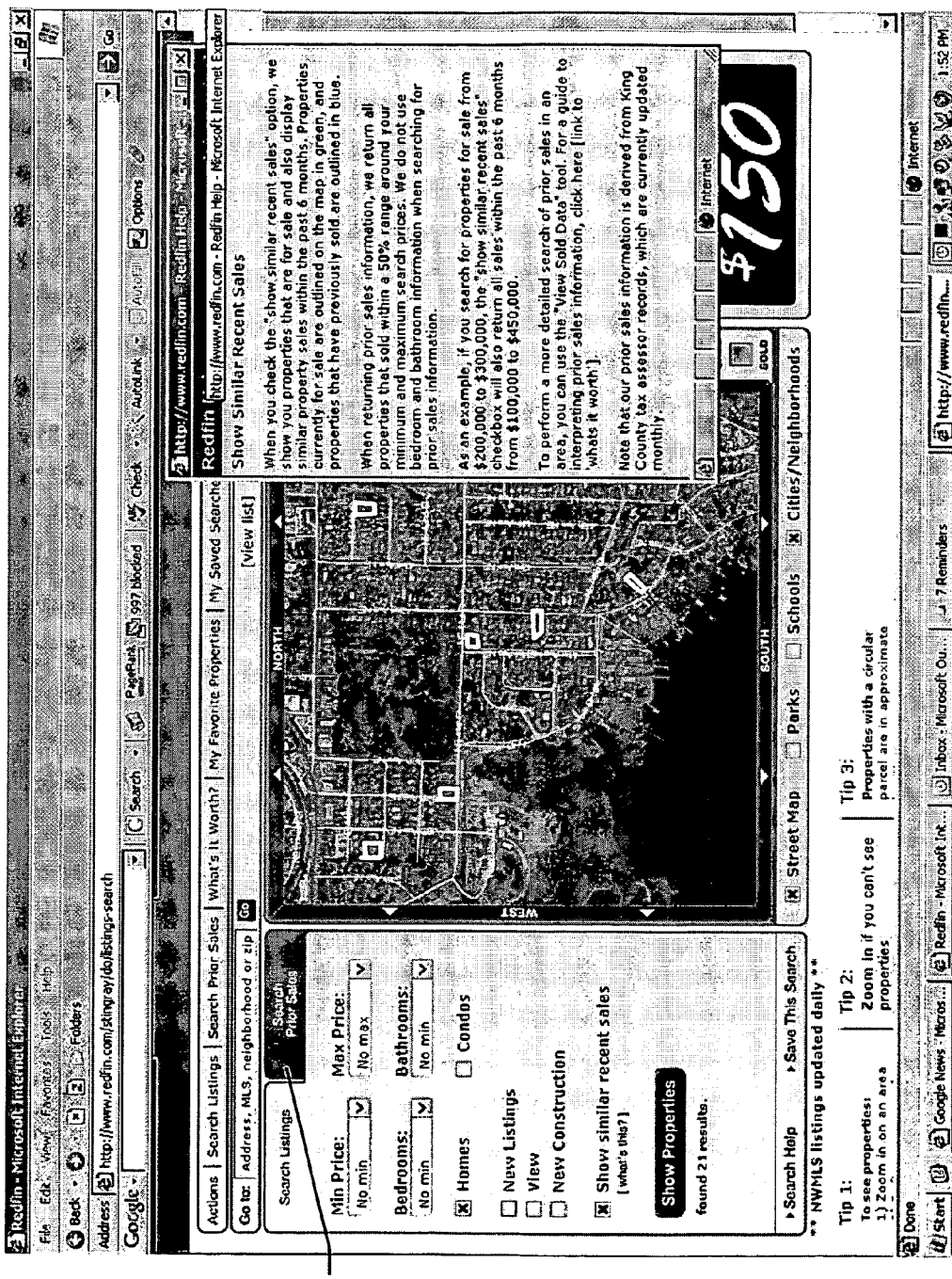
FIG. 10 shows an overlay on the image of FIG. 6 of historical sales near the selected property.

FIG. 10 shows an example of a web page displaying information about historical sales of homes in the geographic region according to some embodiments of the disclosed invention. By selecting the "Show similar recent sales" tab 1000 (e.g., to see comparable sales in the area) with a pointing device such as a computer mouse, the web site system 100 will display an overlay showing the location of previously sold homes in a similar method to how it displays the overlay of houses that are currently for sale. In the embodiment shown, the Web Site System 100 determines which recent sales are "similar" based on predetermined qualities (e.g., price, location, square footage, etc.) and what time period qualifies as "recent". Alternatively, the user can specify what qualities make a real estate property similar to the one that the user has selected and what time period to search. Information about the previously sold homes can be displayed in the aggregate or for each property by selecting a particular property from the overlay. After selecting a property in the "Show similar recent sales" overlay, the client computer 505 transmits the selection to the WSS Server 515. After receiving the parcel selection, the WSS Server 515 retrieves the sales history for the selected property from WSS Database 540 and updates web page 600 accordingly.

Figure 11:
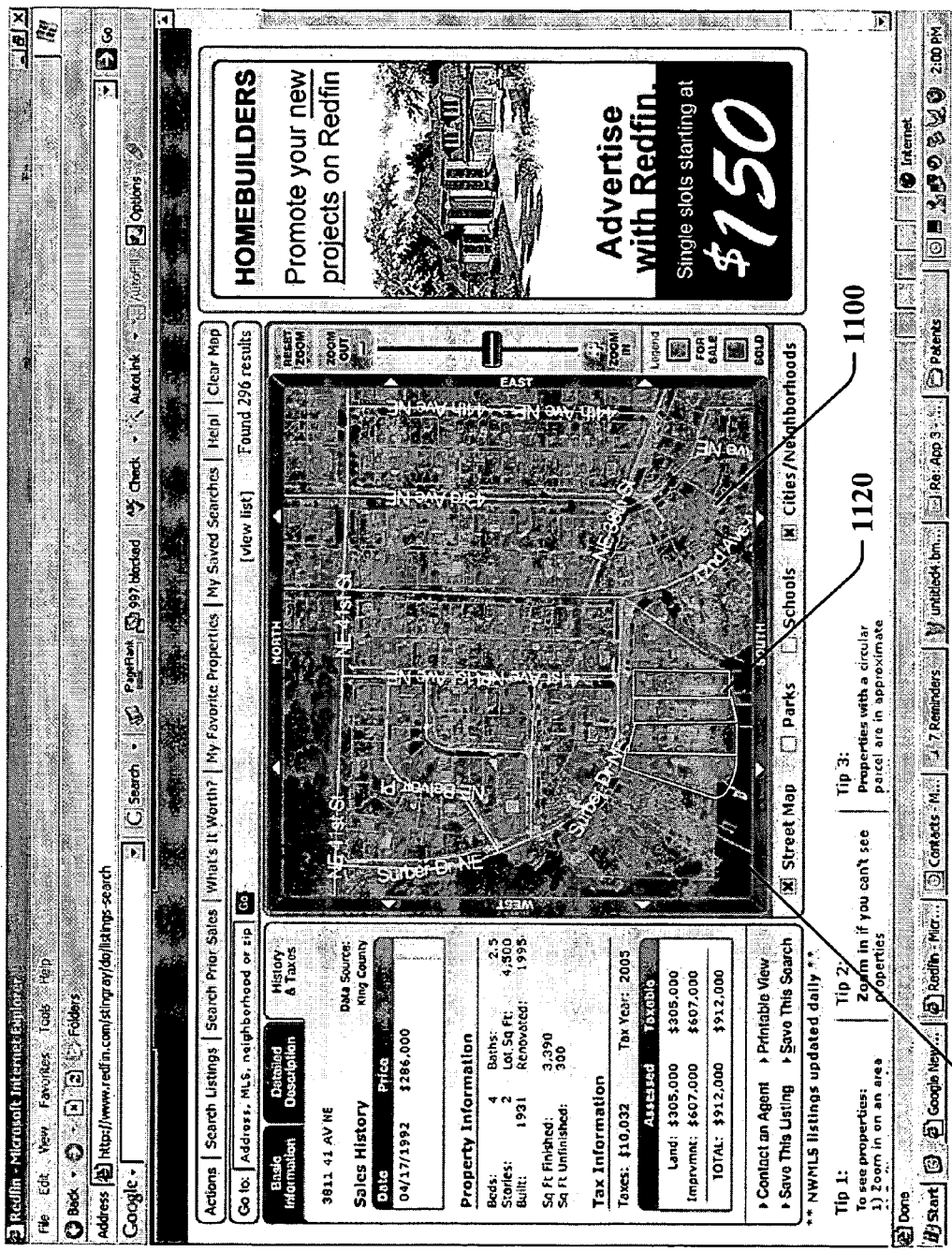
FIG. 11 shows an overlay that superimposes all tax parcels on the image of FIG. 6.

FIG. 11 shows an example of a web page 600 where the tax parcel overlay 1100 shows all tax parcels in the displayed geographic region. The overlay 1100 is visually superimposed on the underlying image 620. A small portion 1120 of overlay 1100 has been manually highlighted to make the tax parcel boundaries more visible.

Figure 12:
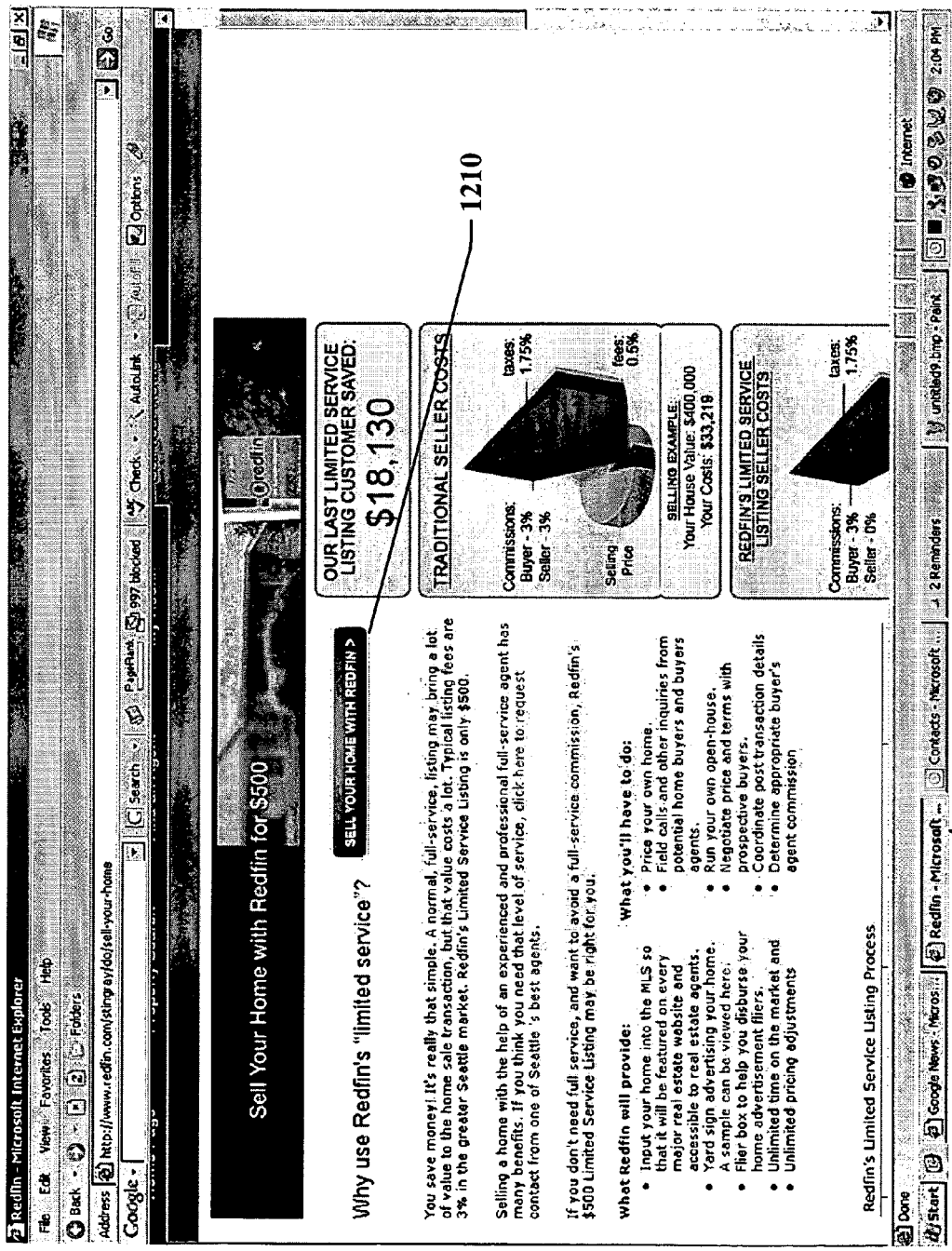
FIG. 12 is a pictorial diagram illustrating an exemplary Web page.
Figure 13:
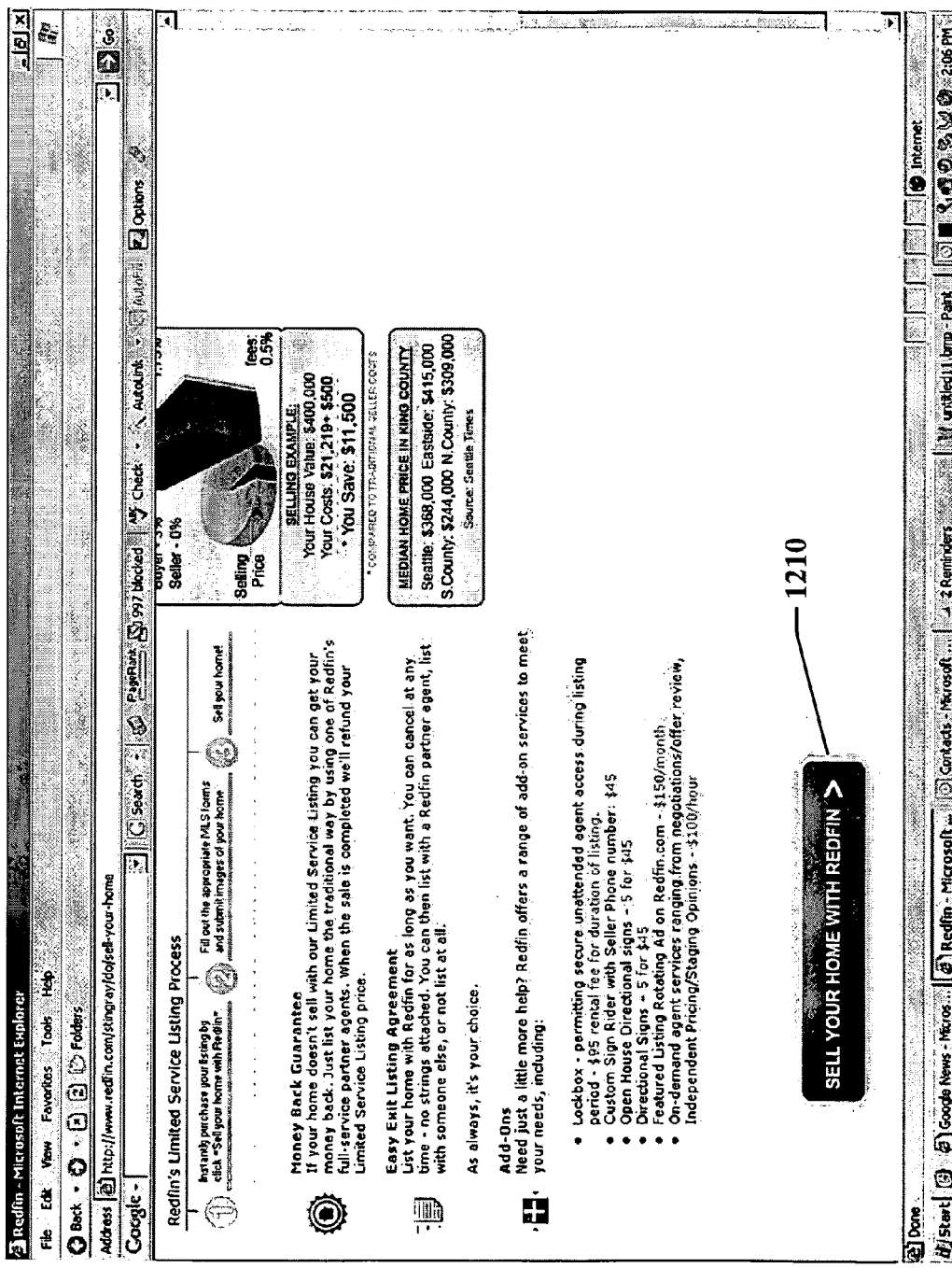
FIG. 13 is a pictorial diagram illustrating an exemplary Web page.

FIGS. 12 and 13 show an example of a web page 1200 where a home seller can use the Web Site System 100 to list a property for sale in the MLS. By selecting the "Sell Your Home with Redfin" button 1210, the seller can enter information about, and optional photographs of, their property into an online form. The seller can select additional services and products such as lockbox, additional signs, featured listing status on the property search web page 600, on-demand agent services, etc. The system 100 can automatically assign the completed form to an employee or contractor real estate agent for entry into the MLS and provision of any on-demand services.

Aspects of the invention described above may be stored or distributed on computer-readable media, including magnetic and optically readable and removable computer discs, as well as distributed electronically over the Internet or over other networks (including wireless networks). Those skilled in the relevant art will recognize that portions or embodiments of the invention may reside in a fixed element of a communication network, while corresponding portions may reside on a mobile communication device, such as a laptop computer, Personal Digital Assistant ("PDA"), or mobile phone. Data structures and transmission of data particular to aspects of the invention are also encompassed within the scope of the invention.

In accordance with the practices of persons skilled in the art of computer programming, embodiments the invention are described with reference to acts and operations that are performed by computer systems. Such computer-executed acts and operations may be performed by an operating system or an application program. The acts and operations include the manipulation by the CPU of electrical signals representing data bits and the maintenance of data bits of memory locations to operate the computer systems and process signals. The memory locations where data bits are maintained are physical locations that have particular electrical, magnetic, or optical properties corresponding to the data bits.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the embodiments described herein. These and other changes can be made to the invention in light of the detailed description.

Aspects of the invention can be modified, if necessary, to employ the systems, functions and concepts of the various references described above to provide yet further embodiments of the invention.

These and other changes can be made to the invention in light of the above detailed description. In general, the terms used in the following claims should not be construed to be limited to the specific embodiments disclosed in the specification, unless the above detailed description explicitly defines such terms. Accordingly, the actual scope of the invention encompasses the disclosed embodiments and all equivalent ways of practicing or implementing the invention under the claims.

In view of the many possible embodiments to which the principles of this invention may be applied, it should be recognized that the detailed embodiments are illustrative only and should not be taken as limiting the scope of the invention. Rather, we claim as our invention all such embodiments as may come within the scope and spirit of the following claims and equivalents thereto.

The embodiments of the invention in which an exclusive property or privilege is claimed are defined as follows:

1. A method of providing a mapped display of real estate information to a computer user across a network, comprising:
    updating a database of information related to a plurality of real estate properties, the database updated from selectively downloading and aggregating new data from multiple sources, including at least one database of satellite map images of the plurality of real estate properties and at least one database of tax information for the plurality of real estate properties;
    associating, within the database, portions of the selectively downloaded and aggregated new data to other data stored within the database based at least on geographical location information associated with the portions of the selectively downloaded and aggregated new data and associated with the other data stored within the database;
    providing data displayable as a client interface to a client computer across a network;
    receiving data from the client interface indicating a request for a mapped display of real estate information for at least one of the plurality of real estate properties at a particular geographical location;
    creating mapped display data by visually defining the at least one of the plurality of real estate properties on one of the satellite map images and layering of at least some of the portions of the selectively downloaded and aggregated new data that are associated with the particular geographical location over the visually defined real estate properties;
    sending the mapped display data to the client interface that requested the mapped display; and
    visually communicating sales trend data by overlaying one or more layers over the mapped display data such that different colors overlaid over the mapped display data indicates different sales trends within a geographical area.

2. The method of claim 1, further comprising updating the database of information to store annotations received from the client interface and associated with the at least one of the plurality of real estate properties.

3. The method of claim 1 further comprising displaying prior sales data associated with the at least one of the plurality of real estate properties.

4. The method of claim 1, wherein the mapped display data further includes visually defined boundary information for the at least one of the plurality of real estate properties located within a displayed geographical region of the one of the satellite map images.

5. The method of claim 1, wherein the mapped display data includes a tax parcel overlay on the visually defined real estate property with vector information defining the bounds of the real estate property.

6. The method of claim 1, wherein the mapped display data further includes data indicating that the at least one of the plurality of real estate properties is currently offered for sale.

7. The method of claim 1, further comprising analyzing data in the se database to predict a sales price for the at least one of the plurality of real estate properties.

8. The method of claim 1, wherein the data received from the client indicate a search for one or more of the plurality of the real estate properties, the search including one or more of a minimum price and a maximum price, the method further comprising including sales price data for other real estate properties within a certain price range of the one or more of the minimum price and the maximum price.

9. The method of claim 1, further comprising visually overlaying school information on the satellite map image within the mapped display data.

10. The method of claim 1, further comprising visually overlaying street overlay on the one of the satellite map images within the mapped display data.

11. A system for providing a mapped display of real estate information to a client computer user across a network, comprising:
at least one computing system that includes:
a data set of information related to a plurality of real estate properties, the data set created from selectively aggregating information from multiple sources, including at least satellite map images of the real estate properties and tax information for the real estate properties;
an update engine that selectively updates the data set as new data is added to each of the multiple sources;
an analytical engine that associates portions of the new data to the information in the data set based at least on matching physical address information associated with the portions of the new data to physical address information associated with the information in the data set; and
a geographical information system that creates mapped display data by visually defining at least one of the plurality of real estate properties at a particular geographical location on one of the satellite map images and layering at least some of the portions of the aggregated information that are associated with the particular geographical location over the visually defined at least one of the plurality of real estate properties,
a sales trend information system that visually communicates sales trend data by overlaying one or more layers over the mapped display data such that different colors overlaid over the mapped display data indicates different sales trends within a geographical area,
wherein the computer system further provides data displayable on a client interface of the client computer across a network, and upon receiving data from the client interface indicating that a request for a mapped display of real estate information for the at least one of the plurality of real estate properties, the geographical information system creates the mapped display data for the at least one of the plurality of real estate properties and the computer system sends the mapped display data to the client computer requesting the mapped display.

12. The system of claim 11, further comprising a user management system that identifies users and manages the interaction of the users with the computer system.

13. The system of claim 11, wherein the update engine further updates the data set upon the computer system receiving annotations data from the client interface regarding the at least one of the plurality of real estate properties.

14. The system of claim 11, wherein the mapped display data further includes prior sales data associated with the at least one of the plurality of real estate properties.

15. The system of claim 11, wherein the geographical information system further visually defines boundary information for the at least one of the plurality of real estate properties located within a displayed geographical region of the one of the satellite map images.

16. The system of claim 11, wherein the geographical information system further layers a tax parcel overlay on the visually defined real estate property, wherein vector information defines the bounds of the at least one of the plurality of real estate properties.

17. The system of claim 11, wherein the geographical information system further includes within the mapped display data further data indicating that the at least one of the plurality of real estate properties is currently offered for sale.

18. The system of claim 11, wherein the analytical engine further analyzes the data set to predict at least one of: a derivative calculation, association, comparison, or prediction regarding the at least one of the plurality of real estate properties.

19. The system of claim 11, wherein the data received from the client interface includes an indication to show similar sales, the geographical information system further providing to the client interface recent sales prices for similar real estate properties sold within a similar geographical region as the at least one of the plurality of real estate properties.

20. A system for providing a mapped display of real estate information to a client computer user across a network, comprising:
at least one computing system that includes:
means for storing a data set of information related to a plurality of real estate properties, the data set storing aggregated information from multiple sources, including at least satellite map images of the plurality of real estate properties and tax information for the plurality of real estate properties;
means for selectively updating the data set with new data from each of the multiple sources;
means for associating portions of the new data to the stored aggregated information based on a match of geographical location information associated with the portions of the new data with geographical location information associated with stored aggregated information;
means for creating mapped display data by visually defining at least one of the plurality of real estate properties at a particular geographical location on one of the satellite map images and layering at least some of the portions of the aggregated information that are associated with the particular geographical location, including the tax information, over the at least one visually defined real estate property;
means for visually communicating sales trend data by overlaying one or more layers over the mapped display data such that different colors overlaid over the mapped display data indicates different sales trends within a geographical area;
means for providing data displayable as a client interface to the client computer across a network;
means for receiving data from the client interface indicating a request for a mapped display of real estate information for the at least one of the plurality of real estate properties; and
means for sending the mapped display data to the client computer requesting the mapped display upon the means for creating mapped display data for the at least one of the plurality of real estate properties creating the mapped display data therefor.

21. The system of claim 20, further comprising means for identifying users and managing the interaction of the users with the computer system.

* * * * *